United States Patent [19]

Woodhouse et al.

[11] 4,295,177

[45] Oct. 13, 1981

[54] CONTROL CIRCUITS FOR SOLENOIDS

[75] Inventors: Richard G. Woodhouse; Peter H. Salway, both of Birmingham, England

[73] Assignee: Lucas Industries Limited, Birmingham, England

[21] Appl. No.: 64,644

[22] Filed: Aug. 7, 1979

[30] Foreign Application Priority Data

Aug. 24, 1978 [GB] United Kingdom ............... 34442/78

[51] Int. Cl.³ ......................... F02D 5/02; G05B 11/01

[52] U.S. Cl. .................................... 361/154; 361/194; 123/490

[58] Field of Search ................ 361/154, 194; 123/178, 123/190

[56] References Cited

U.S. PATENT DOCUMENTS 3,549,955 12/1970 Paine .

3,896,346 7/1975 Ule .

3,982,505 9/1976 Rivere ............................ 361/154 X 4,180,026 12/1979 Schulzke et al. ............... 361/154 X

FOREIGN PATENT DOCUMENTS 2655615 6/1977 Fed. Rep. of Germany ...... 123/478

2319433 2/1977 France .

OTHER PUBLICATIONS

"Pedestal Driver for Inductive Loads," Bateson, et al., *IBM Technical Disclosure Bulletin,* vol. 20, No. 8, Jan. 1978.

"Current Driver for Inductive Loads with Pedestal," Arnold, IBM Tech. Disclosure Bulletin, vol. 17, No. 4, Sep. 1974.

*Primary Examiner*—J. D. Miller

*Assistant Examiner*—L. C. Schroeder

*Attorney, Agent, or Firm*—Schwartz, Jeffery, Schwaab, Mack, Blumenthal & Koch

[57] ABSTRACT

A solenoid control circuit includes a first switching element which connects one side of the solenoid load to earth via a current sensing resistor. The other side of the solenoid load is connected by a second switching element to a supply rail. This second switching element is biased to conduct but can be turned off by either of two comparators which are connected to compare the voltage across the current sensing resistor with two different reference voltages. Each comparator has hysteresis and the circuit operates so that one comparator operates to switch off the second switching element when a predetermined current level is reached and the other comparator operates to switch the second switching elements on and off at lower current levels between said predetermined current level and the lower threshold level of the first comparator.

7 Claims, 2 Drawing Figures

FIG. I.

CONTROL CIRCUITS FOR SOLENOIDS

This invention relates to control circuits for solenoids, for example solenoids which form part of injector valves used in electronic fuel injection systems.

In fuel injection systems it is conventional to use a ballast resistor in series with each solenoid to limit the current in the solenoid. The combination of the ballast resistor and the inductance of the solenoid, however, introduces a lag into the control system which has to be taken into account in designing the system. Unfortunately the lag varies with the values of the resistance and inductance and also with the supply voltage and since, in some conditions, the duration of the lag is of the same order of magnitude as the required valve open duration, the errors which arise can be very significant.

In addition the ballast resistor is required to dissipate a significant amount of power and must therefore be of a relatively expensive high power type.

Various proposals have been made which envisage shorting out of the ballast resistor for the initial period of valve energisation but such circuits have not been altogether satisfactory. It has also been proposed to omit the ballast resistor altogether but an extremely complex electronic circuit is employed.

It is an object of the present invention to provide a solenoid control circuit in which there is no ballast resistor, but which is of a simple configuration.

In accordance with the invention there is provided a solenoid control circuit comprising semi-conductor switch means and a current sensing element in series with the solenoid between a pair of supply terminals, initiating means for turning on said switch means to initiate current flow in the solenoid, first means sensitive to said current sensing element for turning off said switch means when the solenoid current reaches a first predetermined level and second means sensitive to said current sensing element for turning the switch means on and off to maintain the solenoid current at a second predetermined level lower than said first predetermined level, said second means sensitive to said current sensing element initially being overridden by said first means sensitive to the current sensing element.

Preferably said first means sensitive to the current sensing element is a first voltage comparator with a positive feedback circuit providing hysteresis such that the lower threshold level of the voltage comparator is lower than said second predetermined level.

The second means sensitive to the current sensing element may be a second voltage comparator with a positive feedback circuit providing hysteresis, the reference level and hysteresis of said second voltage comparator being chosen so that the upper and lower threshold levels of the second comparator are respectively lower and higher than the upper and lower threshold levels of the first comparator.

The semi-conductor switching means preferably includes two separate first and second switching devices controlled respectively by said initiating means and by said first and second current sensitive means.

Preferably said second switching device is controlled by a semi-conductor drive element connected to operate as a constant current source providing a constant bias current to the second switching device irrespective of supply voltage variations, said drive element being normally conductive but being turned off by said first and second current sensitive means.

An example of the invention is shown in the accompanying drawings in which.

Figure 1:
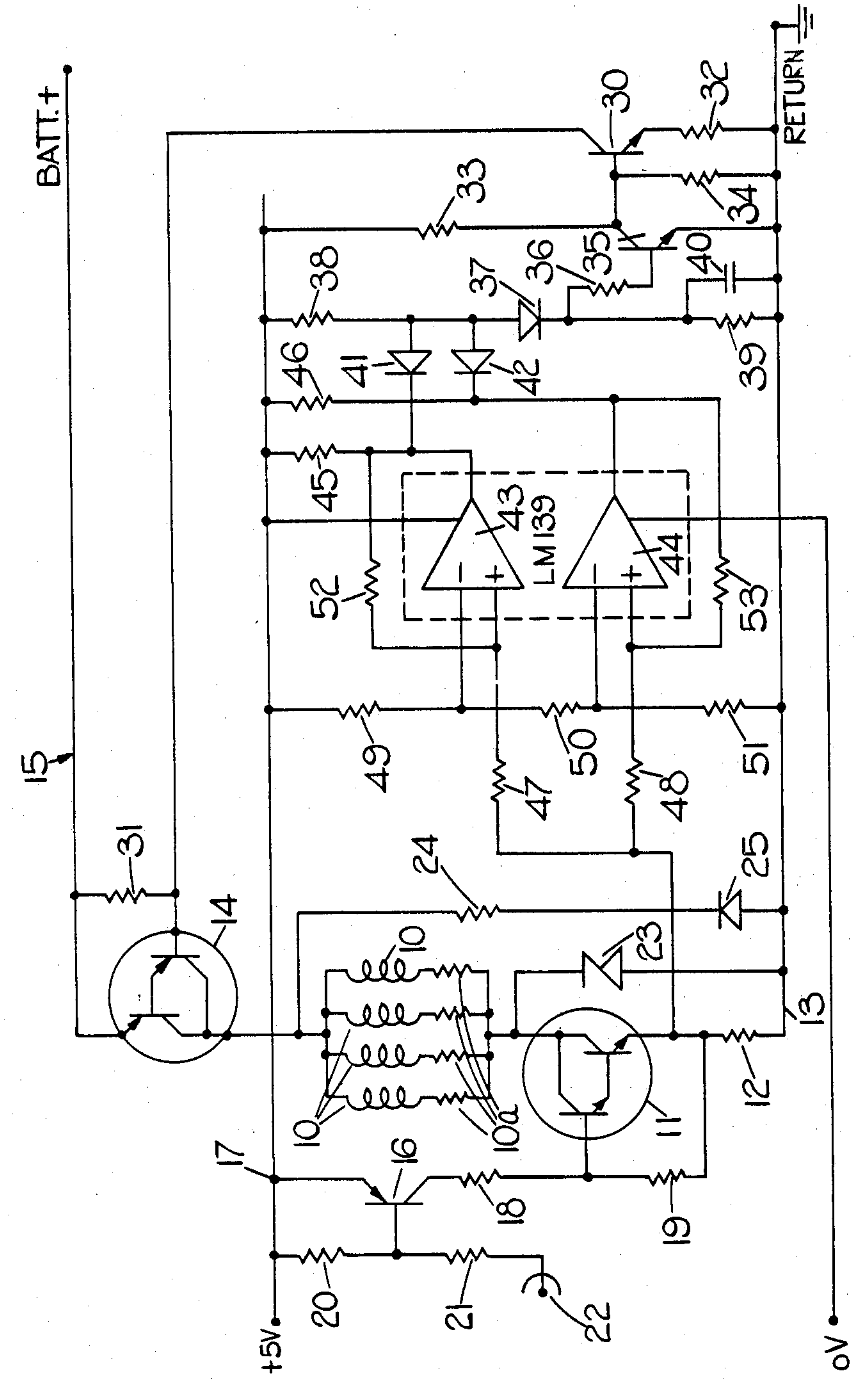
FIG. 1 is a circuit diagram of the control circuit.

The circuit shown in FIG. 1 is used to drive four solenoids 10 in parallel, each solenoid being shown in series with a resistor 10*a* representing the actual d.c. resistance of the solenoid. One end of each solenoid is connected to a first semi-conductor switching device in the form of an integrated npn Darlington pair 11. The solenoids 10 are connected to the collector of the device 11 the emitter of which is connected by a current sensing element in the form of a low value resistor 12, to an earth rail 13. The other end of each solenoid 10 is connected to the collector of an integrated pnp Darlington pair 14 which constitutes a second semi-conductor switching device. The emitter of the Darlington pair 14 is connected to a positive supply rail 15.

Initiating means is provided for controlling the Darlington pair 11, such initiating means including a pnp transistor 16 having its emitter connected to a regulated 5 V supply rail 17 and its collector connected by a resistor 18 to the base of the Darlington pair 11. A resistor 19 is connected between the base and emitter of the Darlington pair 11. The base of transistor 16 is connected by a resistor 20 to the rail 17 and by a resistor 21 to an input terminal 22 so that when terminal 22 is grounded by an injection timing control (not shown) transistor 16 turns on and supplies base current to the Darlington pair 11.

For the protection of the Darlington pair 11 there is provided a zener diode 23 connecting the collector of the Darlington pair 11 to earth. In addition a resistor 24 and diode 25 are connected in series between the collector of Darlington pair 14 and earth. Diode 25 conducts recirculating current whenever Darlington pair 14 is turned off, the zener diode 23 conducting the recirculating current when Darlington pair 11 turns off.

The Darlington pair 14 is controlled by an npn drive transistor 30 connected to draw a constant current through the base-emitter of the Darlington pair 14. A resistor 31 is also connected across this junction to ensure that the Darlington pair 14 can switch off. To this end the emitter of transistor 30 is connected by a resistor 32 to the rail 13 and its base is connected to the junction of two resistors 33, 34 connected between the rails 17 and 13. Since there is a regulated +5 V supply to the rail 17 the voltage at the base of transistor 30 is not dependent on the battery voltage (unless this falls so low that the 5 V regulator ceases to operate correctly).

An npn control transistor 35 has its collector connected to the base of the transistor 30 and its emitter connected to the rail 13 so that when transistor 35 is turned on it switches off transistor 30 and thereby causing Darlington pair 14 to become non-conductive. The base of transistor 35 is connected by a resistor 36 to the cathode of a diode 37, the anode of which is connected to by a resistor 38 to the rail 17. The cathode of diode 37 is also connected by a resistor 39 and a capacitor 40 in parallel to the rail 13.

The anode of the diode 37 is connected to the anodes of two diodes 41,42 the cathodes of which are connected to the output terminals of two integrated circuit voltage comparators 43, 44 respectively, two pull-up resistors 45, 46 connecting the respective output terminals to the +5 V rail 17. The non-inverting input terminals of the comparators 43, 44 are connected by resistors 47, 48 to the emitter of Darlington pair 11 and their inverting input terminals are connected to points on a resistor chain 49, 50, 51 connected between the rails 17 and 13. Each comparator 43, 44 has a feedback resistor 52, 53 connecting its output terminal to its non-inverting input terminal to provide hysteresis. The ratio of the values of resistors 53 and 48 is relatively high so that the hysteresis margin is low, but the ratio of the values of resistors 52 and 47 is comparatively low so that the hysteresis margin of comparator 43 is much greater. In fact, the values of resistors 47 to 53 inclusive are chosen so that the lower threshold value of comparator 43 is at a current of about 1 amp in the resistor 12, its upper threshold value is at about 5.2 amps, and the upper and lower threshold values for the comparator 44 being at about 2.4 and 2.0 amps respectively.

Figure 2:
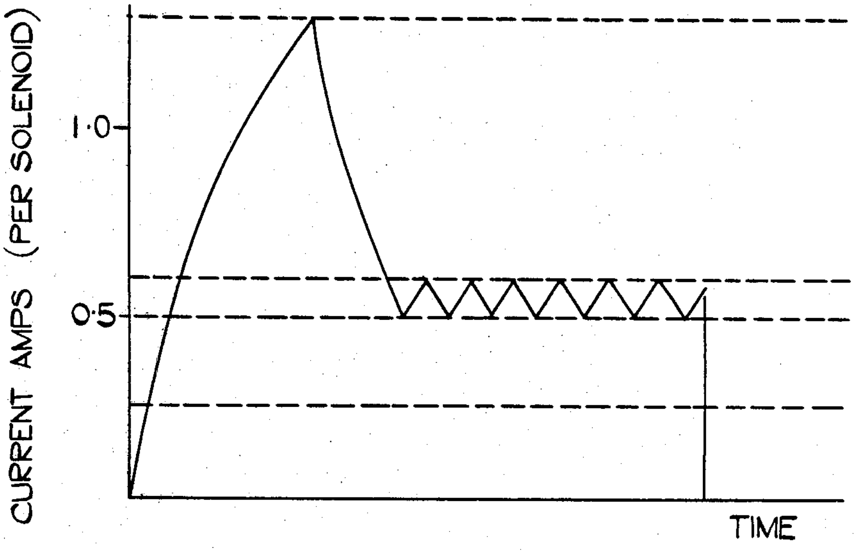
FIG. 2 is a graph showing how load current varies with time.

In operation when the terminal 22 is not grounded Darlington pair 11 will be off so that there will be no current in resistor 12. Thus the outputs of both comparators 43 and 44 will be low, thereby minimizing transistor 35 turned off and transistor 30 and the Darlington pair 14 on. When the terminal 22 is grounded Darlington pair 11 turns on and the current in the solenoids starts to rise as shown in FIG. 2. When the current reaches 0.6 amps per solenoid (i.e. 2.4 amps) the output of comparator 44 goes high, but this has no effect since the output of comparator 43 remains low. Only when the current reaches 5.2 amps will the output of comparator 43 go high, thereby causing transistor 35 to turn on and turning transistor 30 and the Darlington pair 14 off. The solenoid current recirculates through diode 25 and resistor 24 and decays until it reaches 2.0 amps total whereupon the output of comparator 44 goes low, thereby turning on the Darlington pair 14 again. The load current now increases to 2.4 amps, so that the output of comparator 44 goes high again and Darlington pair 14 turns off. The current thus continues to fluctuate between 2.0 and 2.4 amps until the terminal 22 ceases to be grounded. Darlington pair 11 then turns off and the solenoid current decays very rapidly, because of the action of zener diode 23.

In the event of the load being shorted out, when terminal 22 is grounded the current in resistor 12 will rise very quickly indeed, and will be limited at 5.2 amps as before. The current will then fall very rapidly, but, since the capacitor 40 will have charged up through resistor 38 whilst the current was rising and takes longer to discharge through resistor 39, transistor 35 will not switch off immediately. When capacitor 40 has discharged sufficiently transistor 35 turns off again, allowing transistor 30 to turn on and therefore allowing another short current pulse to pass through the Darlington pairs. The resistors 38, 39 are chosen to give a mark to space ratio in excess of 1:10, and the value of capacitor 40 is chosen so that it does not interfere with the normal operation of the circuit, the time constants for current build-up and decay in the solenoids being longer than those for charge and discharge of the capacitor 40.

We claim:

1. A solenoid control circuit comprising semi-conductor switch means and a current sensing element in series with the solenoid between a pair of supply terminals, initiating means for turning on said switch means to initiate current flow in the solenoid, first means sensitive to said current sensing element for turning off said switch means when the solenoid current reaches a first predetermined level and second means sensitive to said current sensing element for turning the switch means on and off to maintain the solenoid current at a second predetermined level lower than said first predetermined level, said second means sensitive to said current sensing element initially being overridden by said first means sensitive to the current sensing element, said semi-conductor switching means including two separate first and second switching devices controlled respectively by said initiating means and by said first and second current sensitive means.

2. A solenoid control circuit as claimed in claim 1 in which said first means sensitive to the current sensing element is a first voltage comparator with a positive feedback circuit providing hysteresis such that the lower threshold level of the voltage comparator is lower than said second predetermined level.

3. A solenoid control circuit as claimed in claim 2 in which said second means sensitive to the current sensing element may be a second voltage comparator with a positive feedback circuit providing hysteresis, the reference level and hysteresis of said second voltage comparator being chosen so that the upper and lower threshold levels of the second comparator are respectively lower and higher than the upper and lower threshold levels of the first comparators.

4. A solenoid control circuit as claimed in claim 1 in which said second switching means is controlled by a semi-conductor drive element connected to operate as a constant current source providing a constant bias current to the second switching device irrespective of supply voltage variations, said drive element being normally conductive but being turned off by said first and second current sensitive means.

5. A solenoid control circuit as claimed in claim 4 in which said drive element is a transistor having its collector connected to the second switching device, its emitter connected to one terminal of a regulated d.c. supply by a resistor and its base connected to a point on a resistor chain connected across said regulated supply.

6. A solenoid control circuit as claimed in claim 5 in which said drive transistor has its base connected to said one terminal supply by the collector-emitter path of a control transistor connected to be controlled by the first and second current sensitive means.

7. A solenoid control circuit as claimed in claim 6 including short circuit protection means associated with said control transistor for determining the mark:space ratio of the current in said switching means in the event that the solenoid is short circuited.

* * * * *